United States Patent
Matsusue

(10) Patent No.: US 12,037,482 B2
(45) Date of Patent: Jul. 16, 2024

(54) FIBROUS CELLULOSE-CONTAINING MATERIAL AND METHOD FOR PRODUCING SAME, DRIED FIBROUS CELLULOSE AND METHOD FOR PRODUCING SAME, AND FIBROUS CELLULOSE COMPOSITE RESIN AND METHOD FOR PRODUCING SAME

(71) Applicant: Daio Paper Corporation, Ehime (JP)

(72) Inventor: Ikko Matsusue, Ehime (JP)

(73) Assignee: Daio Paper Corporation, Ehime (JP)

( * ) Notice: Subject to any disclaimer, the term of this patent is extended or adjusted under 35 U.S.C. 154(b) by 728 days.

(21) Appl. No.: 17/254,031

(22) PCT Filed: Jul. 3, 2019

(86) PCT No.: PCT/JP2019/026428
§ 371 (c)(1),
(2) Date: Dec. 18, 2020

(87) PCT Pub. No.: WO2020/013045
PCT Pub. Date: Jan. 16, 2020

(65) Prior Publication Data
US 2021/0261758 A1    Aug. 26, 2021

(30) Foreign Application Priority Data

Jul. 13, 2018  (JP) ................. 2018-133240

(51) Int. Cl.
*C08L 1/02*    (2006.01)
*C08B 3/12*    (2006.01)

(52) U.S. Cl.
CPC ............... *C08L 1/02* (2013.01); *C08B 3/12* (2013.01)

(58) Field of Classification Search
CPC ... C08L 1/02; C08B 3/12; C08J 3/2053; C08J 5/06; C08J 2323/12; C08J 3/203; C08J 2401/02
See application file for complete search history.

(56) References Cited

FOREIGN PATENT DOCUMENTS

| | | |
|---|---|---|
| JP | 2010-106251 | 5/2010 |
| JP | 2011-219571 | 11/2011 |
| JP | 2011-246615 | 12/2011 |
| JP | 5030667 | 9/2012 |
| JP | 2012-201852 | 10/2012 |
| JP | 2012-229350 | 11/2012 |
| JP | 2013-136859 | 7/2013 |
| JP | 2013-159866 | 8/2013 |
| JP | 2013-189574 | 9/2013 |
| JP | 2014-105407 | 6/2014 |
| JP | 2014-193959 | 10/2014 |
| JP | 5863269 | 2/2016 |
| JP | 2016-89077 | 5/2016 |
| JP | 2016-094538 | 5/2016 |
| JP | 2016-094539 | 5/2016 |
| JP | 2016-94540 | 5/2016 |
| JP | 2016-094541 | 5/2016 |
| JP | 5923370 | 5/2016 |
| JP | 2016-176052 | 10/2016 |
| JP | 2016-194186 | 11/2016 |
| JP | 2017-019976 | 1/2017 |
| JP | 2017-25338 | 2/2017 |
| JP | 2017-66274 | 4/2017 |
| JP | 2018-028174 | 2/2018 |
| JP | 2019-007117 | 1/2019 |
| WO | 2012/120971 | 7/2014 |
| WO | 2013/147063 | 12/2015 |
| WO | 2016108285 | 7/2016 |
| WO | 2016/143801 | 9/2016 |
| WO | 2014/087767 | 1/2017 |
| WO | 2019/156047 | 8/2019 |

OTHER PUBLICATIONS

International Search Report for PCT/JP2019/026428, mailed Oct. 8, 2019.

*Primary Examiner* — Ling Siu Choi
*Assistant Examiner* — Olga Lucia Donahue
(74) *Attorney, Agent, or Firm* — Andrus Intellectual Property Law, LLP

(57) ABSTRACT

A fibrous cellulose-containing material which is excellent in dispersibility of cellulose fiber, is easy to dewater, and is not required to contain an organic solvent, and a method for producing the same; and dried fibrous cellulose and a fibrous cellulose composite resin each obtained using the fibrous cellulose-containing material and a method for producing the same. A dispersion liquid of cellulose microfiber is prepared by fibrillating raw material pulp to the extent that the average fiber width is 0.1 μm or more, a fibrous cellulose-containing material is prepared by mixing the dispersion liquid with resin powder having an average particle size of 1 to 1,500 μm, dried fibrous cellulose is prepared by drying the fibrous cellulose-containing material, and the dried fibrous cellulose is kneaded to obtain a fibrous cellulose composite resin.

13 Claims, No Drawings

FIBROUS CELLULOSE-CONTAINING MATERIAL AND METHOD FOR PRODUCING SAME, DRIED FIBROUS CELLULOSE AND METHOD FOR PRODUCING SAME, AND FIBROUS CELLULOSE COMPOSITE RESIN AND METHOD FOR PRODUCING SAME

CROSS-REFERENCE TO RELATED APPLICATIONS

This application is the U.S. national stage application of International Application PCT/JP2019/026428, filed Jul. 3, 2019, which international application was published on Jan. 16, 2020, as International Publication WO 2020/013045 in the Japanese language. The International Application claims priority of Japanese Patent Application No. 2018-133240, filed Jul. 13, 2018. The international application and Japanese applications are both incorporated herein by reference, in entirety.

TECHNICAL FIELD

The present invention relates to a fibrous cellulose-containing material and a method for producing the same, dried fibrous cellulose and a method for producing the same, and a fibrous cellulose composite resin and a method for producing the same.

BACKGROUND ART

In recent years, attention has been paid to nanotechnology for reducing the size of substances to a nanometer level to obtain new physical properties different from the conventional properties of the substances. Cellulose nanofiber produced from pulp as a cellulose-based raw material by chemical treatment, grinding treatment, or the like is excellent in strength, elasticity, thermal stability, and the like, and is therefore expected to be used in industrial applications as filtering materials, filter aids, base materials for ion exchangers, fillers for chromatographic analysis equipment, fillers for blending resins and rubbers, and the like, and applications of blending agents for cosmetics such as lipsticks, cosmetic powder, and emulsified cosmetics. In addition, cellulose nanofiber is excellent in aqueous dispersibility, and is therefore expected to be used in many applications of viscosity-retaining agents for foods, cosmetics, coating materials, and the like, strengthening agents for food raw material doughs, moisture-retaining agents, food stabilizers, low-calorie additives, emulsion stabilization aids, and the like.

It is currently proposed that cellulose nanofiber obtained by micronizing plant fiber is used as a reinforcing material for resin. However, when cellulose nanofiber is used as the resin reinforcing material, the cellulose nanofiber is irreversibly aggregated by intermolecular hydrogen bonds derived from the hydroxyl groups of a polysaccharide. In addition, the fiber is torn during kneading with resin, so that a sufficient three-dimensional network cannot be constructed in the resin. Therefore, even when cellulose nanofiber is used as a reinforcing material, a sufficient three-dimensional network cannot be constructed because of poor dispersibility of the cellulose nanofiber in the resin. As a result, there is the problem that the reinforcing effect of the resin is not sufficiently exhibited.

Thus, Patent Literature 1 suggests use of an organic solvent, particularly a water-soluble solvent, for enhancing the dispersibility of cellulose fiber. However, as is pointed out in the literature itself, use of an organic solvent causes problems such as a decrease in productivity and an increase in production cost. When an organic solvent is used, the strength of composite resin containing cellulose fiber may be insufficient.

Thus, the suggestion in Patent Literature 2 serves as a useful reference. The literature suggests that resin powder having an average particle size of 1,000 µm or less is added to and mixed with a dispersion liquid of microfibrillated cellulose for eliminating the necessity of an organic solvent. According to the literature, "this enables preparation of a homogeneous mixed dispersion liquid, and dewatering and drying of the mixed dispersion liquid improves the dispersibility of microfibrillated cellulose in the resin, and eliminates the necessity of a high temperature or an organic solvent" (paragraph "0004" in the literature). However, the literature does not give consideration to dewatering and drying after dispersion. Regarding the microfibrillated cellulose to which resin powder is added, the literature assumes use of cellulose nanofiber by stating that "the average fiber diameter of microfibrillated cellulose is preferably 4 nm to 400 nm" (paragraph "0009" in the literature). However, cellulose nanofiber has high water retentivity, and is difficult to dewater. Therefore, it is necessary to make a suggestion which gives consideration to dewaterability as well as dispersibility. Dewatering and drying of cellulose nanofiber causes the problem that cellulose fiber is aggregated by hydrogen bonds, and thus becomes difficult to disperse. However, the literature does not disclose a solution to this problem.

The problem of dispersibility itself is pointed out in, for example, Patent Literature 3. For solving the problem of dispersibility, the literature suggests a resin modifying additive containing cellulose nanofiber having an average fiber diameter of 1 to 200 nm and resin particles having an average particle size of 0.01 to 500 µm. In the literature, however, dewaterability is not considered. On the contrary, the cellulose nanofiber in the same literature contains a carboxyl group, and therefore has higher hydrophilicity and lower dewaterability, and does not have sufficient dispersibility in the resin.

CITATION LIST

Patent Literature

Patent Literature 1: JP 5863269 B2
Patent Literature 2: JP 5030667 B2
Patent Literature 3: JP 5923370 B2

SUMMARY OF INVENTION

Technical Problem

Main objects to be achieved by the present invention are to provide a fibrous cellulose-containing material which is excellent in dispersibility of cellulose fiber, is easy to dewater, and is not required to contain an organic solvent, and a method for producing the same; and dried fibrous cellulose and a fibrous cellulose composite resin each obtained using the fibrous cellulose-containing material and a method for producing the same.

Solution to Problem

In order to achieve the above-described objects, the present inventors have applied various treatments to cellulose nanofiber (cellulose fine fiber), and explored methods for kneading cellulose nanofiber and resin. That is, the present inventors have conducted various studies on the premise of using cellulose nanofiber. However, it has been shown that even when, for example, hydrophobic modification is performed or a compatibilizer is used when compounding cellulose nanofiber with resin, a sufficient reinforcing effect cannot be obtained because the dispersibility of cellulose nanofiber in the resin is not sufficient, and a sufficient three-dimensional network is not formed. Nevertheless, in the process of the studies, it has been found that when the raw material fiber is cellulose microfiber, the fiber has better dispersibility in the resin, a more sufficient three-dimensional network is formed in the resin, and a better reinforcing effect can be obtained than when the raw material fiber is cellulose nanofiber. Further, it has been found that the dewaterability of cellulose microfiber having a predetermined fiber width is improved by combining the cellulose microfiber with resin powder having a predetermined particle size. This discovery is based on use of cellulose microfiber instead of cellulose nanofiber considered intrinsically unable to be dewatered. That is, it has been found that mixing of resin powder improved dewaterability with use of cellulose microfiber as a factor. The thus-obtained fibrous cellulose-containing material does not absolutely require use of an organic solvent.

Under the above circumstances, the present inventors have arrived at the following means.

(Means Recited in Claim 1)
A fibrous cellulose-containing material including
cellulose microfiber having an average fiber width of 0.1 μm or more, and resin powder having an average particle size of 1 to 1,500 μm.

(Means Recited in Claim 2)
The fibrous cellulose-containing material according to claim 1,
wherein the combination ratio of the resin powder is 10 to 100,000 parts by mass based on 100 parts by mass of the cellulose microfiber.

(Means Recited in Claim 3)
The fibrous cellulose-containing material according to claim 1 or 2,
wherein the cellulose microfiber has an average fiber length of 0.02 to 3.0 mm and a fibrillation ratio of 1.0% or more.

(Means Recited in Claim 4)
The fibrous cellulose-containing material according to any one of claims 1 to 3,
wherein the cellulose microfiber is modified with a polybasic acid, and/or
the fibrous cellulose-containing material contains a polybasic acid.

(Means Recited in Claim 5)
Dried fibrous cellulose formed by drying a fibrous cellulose-containing material including
cellulose microfiber having an average fiber width of 0.1 μm or more, and a resin powder having an average particle size of 1 to 1,500 μm.

(Means Recited in Claim 6)
A fibrous cellulose composite resin formed by kneading a dried fibrous cellulose-containing material including
cellulose microfiber having an average fiber width of 0.1 μm or more, and a resin powder having an average particle size of 1 to 1,500 μm.

(Means Recited in Claim 7)
A method for producing a fibrous cellulose-containing material, including:
preparing a dispersion liquid of cellulose microfiber by fibrillating raw material pulp to the extent that the average fiber width is 0.1 μm or more; and
mixing the dispersion liquid with resin powder having an average particle size of 1 to 1,500 μm.

(Means Recited in Claim 8)
A method for producing dried fibrous cellulose, including:
preparing a dispersion liquid of cellulose microfiber by fibrillating raw material pulp to the extent that the average fiber width is 0.1 μm or more;
preparing a fibrous cellulose-containing material by mixing the dispersion liquid with resin powder having an average particle size of 1 to 1,500 μm; and
concentrating the fibrous cellulose-containing material to a water content ratio of 95% or less, and then performing drying.

(Means Recited in Claim 9)
A method for producing a fibrous cellulose composite resin, including:
preparing a dispersion liquid of cellulose microfiber by fibrillating raw material pulp to the extent that the average fiber width is 0.1 μm or more;
preparing a fibrous cellulose-containing material by mixing the dispersion liquid with resin powder having an average particle size of 1 to 1,500 μm;
preparing dried fibrous cellulose by drying the fibrous cellulose-containing material; and
kneading the dried fibrous cellulose.

(Means Recited in Claim 10)
The method for producing a fibrous cellulose composite resin according to claim 9,
wherein the dried fibrous cellulose and a resin pellet are kneaded,
the dried fibrous cellulose contains resin powder at a combination ratio of 10,000 parts by mass or less based on 100 parts by mass of the cellulose microfiber, and
the combination ratio of the resin pellet is 10 to 100,000 parts by mass based on 100 parts by mass of the resin powder.

Advantageous Effects of Invention

The present invention provides a fibrous cellulose-containing material which is excellent in dispersibility of cellulose fiber, is easy to dewater, and is not required to contain an organic solvent, and a method for producing the same; and dried fibrous cellulose and a fibrous cellulose composite resin each obtained using the fibrous cellulose-containing material and a method for producing the same.

DESCRIPTION OF EMBODIMENT

Embodiments of the invention will now be described. These embodiments are examples of the present invention, and the scope of the present invention is not limited to the scope of these embodiments.

As a conventional main flow of production of a fibrous cellulose composite resin, raw material fiber is fibrillated into a cellulose nanofiber dispersion liquid, the cellulose nanofiber dispersion liquid is dried into dried fibrous cellulose, and the dried fibrous cellulose is mixed with a resin pellet to obtain a fibrous cellulose composite resin. On the other hand, in this embodiment, raw material fiber is fibrillated into a cellulose microfiber dispersion liquid, resin powder is added to (mixed with) the cellulose microfiber dispersion liquid to obtain a fibrous cellulose-containing material, the fibrous cellulose-containing material is dewatered and dried into dried fibrous cellulose, and the dried fibrous cellulose is kneaded to obtain a fibrous cellulose composite resin. That is, the method of this embodiment is significantly different from conventional methods in that the degree of fibrillation of raw material fiber is limited to that of cellulose microfiber instead of cellulose nanofiber, a cellulose microfiber dispersion liquid and a resin are mixed instead of mixing dried fibrous cellulose and a resin, a powdered resin is used instead of a pellet-shaped resin in the mixing, and dewatering is performed prior to drying of the fibrous cellulose-containing material. Thus, these embodiments will be described in detail with a focus on these points of difference.

(Raw Material Fiber)

Cellulose microfiber having an average fiber width of 0.1 μm or more can be obtained by micronizing (fibrillating) the raw material fiber (pulp fiber). As raw material fiber, one or more selected from plant-derived fiber, animal-derived fiber, microbial-derived fiber, and the like can be used. However, it is preferable to use pulp fiber which is plant fiber. When the raw material fiber is pulp fiber, the fiber is inexpensive and the problem of thermal recycle can be avoided.

As plant-derived fiber, one or more selected from wood pulp made from hardwood, softwood, and the like, non-wood pulp made from straw, bagasse, and the like, waste paper pulp (DIP) made from waste paper, damaged paper, and the like can be used.

As wood pulp, one or more selected from chemical pulp such as hardwood kraft pulp (LKP) and softwood kraft pulp (NKP), mechanical pulp (TMP), and waste paper pulp (DIP) can be used. These pulps are pulps used for papermaking applications, and use of these pulps enables effective utilization of existing equipment.

The hardwood kraft pulp (LKP) may be leaf bleached kraft pulp, leaf non-bleached kraft pulp, or leaf semi-bleached kraft pulp. Similarly, the softwood kraft pulp (NKP) may be softwood needle bleached kraft pulp, needle non-bleached kraft pulp, or needle semi-bleached kraft pulp.

The waste paper pulp (DIP) may be any of magazine waste paper pulp (MDIP), newspaper waste paper pulp (NDIP), corrugated waste paper pulp (WP), and other waste paper pulp.

Further, as mechanical pulp, one or more selected from, for example, stone ground pulp (SGP), pressure stone ground pulp (PGW), refiner ground pulp (RGP), chemi-ground pulp (CGP), thermoground pulp (TGP), ground pulp (GP), thermomechanical pulp (TMP), chemithermomechanical pulp (CTMP), refiner mechanical pulp (RMP), bleached thermomechanical pulp (BTMP), and the like can be used.

(Pretreatment)

Preferably, the raw material fiber is pretreated by a chemical method prior to fibrillation. By pretreating the raw material fiber prior to micronization treatment (fibrillation), the number of fibrillations can be significantly decreased, so that the amount of energy for micronization treatment can be significantly reduced.

Examples of the pretreatment by a chemical method include hydrolysis of a polysaccharide with an acid (acid treatment), hydrolysis of a polysaccharide with an enzyme (enzyme treatment), swelling of a polysaccharide with an alkali (alkali treatment), oxidation of a polysaccharide with an oxidizing agent (oxidation treatment), and reduction of a polysaccharide with a reducing agent (reduction treatment).

By applying alkali treatment prior to micronization treatment, some of hydroxyl groups of hemicellulose and cellulose in the pulp are dissociated, and the molecules are anionized, so that intramolecular and intermolecular hydrogen bonds weaken, resulting in exhibition of an effect of promoting dispersion of pulp fiber in micronization treatment.

As the alkali, for example, an organic alkali such as sodium hydroxide, lithium hydroxide, potassium hydroxide, aqueous ammonia solution, tetramethylammonium hydroxide, tetraethylammonium hydroxide, tetrabutylammonium hydroxide, benzyltrimethylammonium hydroxide, or the like can be used. It is preferable to use sodium hydroxide from the viewpoint of production cost.

When enzyme treatment, acid treatment, or oxidation treatment is performed prior to the micronization treatment, it is possible to decrease the water retention degree, increase the crystallinity, and enhance the homogeneity of the cellulose microfiber. In this regard, it is considered that the dispersibility of cellulose microfiber is improved as the water retention degree of the cellulose microfiber decreases, and the number of defects causing collapse of the composite resin decreases as the homogeneity of cellulose microfiber is enhanced, resulting in formation of a composite resin with high strength which enables retention of resin ductility. In addition, enzyme treatment, acid treatment, or oxidation treatment decomposes amorphous regions of hemicellulose and cellulose in pulp. As a result, the amount of energy for miniaturization treatment can be reduced, and the homogeneity and dispersibility of the fiber can be improved. When the ratio of cellulose crystal regions, which is considered to be rigid and low in water retention degree because of aligned molecular chains, to the entire fiber increases, dispersibility is improved, and although the aspect ratio may decrease, a composite resin having high mechanical strength while maintaining ductility can be obtained.

Among above various treatments, it is preferable to perform enzyme treatment, and it is more preferable to additionally perform one or more selected from acid treatment, alkali treatment, and oxidation treatment. Hereinafter, alkali treatment will be described in detail.

Examples of the method for alkali treatment include a method in which raw material fiber is immersed in an alkali solution.

The alkali compound contained in the alkali solution may be an inorganic alkali compound or an organic alkali compound. Examples of the inorganic alkali compound include hydroxides of alkali metals or alkaline earth metals, carbonates of alkali metals or alkaline earth metals, and phosphorus-oxo acid salts of alkali metals or alkaline earth metals. Further, examples of the hydroxides of alkali metals include lithium hydroxide, sodium hydroxide, and potassium hydroxide. Further, examples of the hydroxides of alkaline earth metals include calcium hydroxide. Examples of the carbonates of alkali metals include lithium carbonate, lithium hydrogen carbonate, potassium carbonate, potassium hydrogen carbonate, sodium carbonate, and sodium hydrogen carbonate. Examples of the carbonates of alkaline earth metals include calcium carbonate. Examples of the phosphorus-oxo acid salts of alkali metals include lithium phosphate, potassium phosphate, trisodium phosphate, and disodium hydrogen phosphate. Examples of the phosphates of alkaline earth metals include calcium phosphate and calcium hydrogen phosphate.

Examples of the organic alkali compounds include ammonia, aliphatic amines, aromatic amines, aliphatic ammonium, aromatic ammonium, heterocyclic compounds, and hydroxides, carbonates, and phosphates thereof. Specific examples thereof include ammonia, hydrazine, methylamine, ethylamine, diethylamine, triethylamine, propylamine, dipropylamine, butylamine, diaminoethane, diaminopropane, diaminobutane, diaminopentane, diaminohexane, cyclohexylamine, aniline, tetramethylammonium hydroxide, tetraethylammonium hydroxide, tetrapropylammonium hydroxide, tetrabutylammonium hydroxide, benzyltrimethylammonium hydroxide, pyridine, N, N-dimethyl-4-aminopyridine, ammonium carbonate, ammonium hydrogen carbonate, and diammonium hydrogen phosphate.

The solvent of the alkali solution may be either water or an organic solvent, but is preferably a polar solvent (water or a polar organic solvent such as alcohol), more preferably an aqueous solvent containing at least water.

The pH of the alkali solution at 25° C. is preferably 9 or more, more preferably 10 or more, especially preferably 11 to 14. When the pH is 9 or more, the yield of cellulose microfiber increases. However, when the pH is more than 14, the handleability of the alkali solution is deteriorated.

(Micronization (Fibrillation) Step)

The micronization treatment of raw material fiber can be performed by, for example, beating the raw material fiber with the use of a beater, a homogenizer such as a high-pressure homogenizer or a high-pressure homogenizing apparatus, a millstone-type friction machine such as a grinder or a mill, a single-screw kneader, a multi-screw kneader, a kneader refiner, or the like. Preferably, the micronization treatment is performed with a refiner.

The refiner is an apparatus for beating pulp fiber, and a known apparatus can be used. As the refiner, a conical type refiner, a double disc refiner (DDR), and a single disc refiner (SDR) are preferable from the viewpoint of, for example, ensuring that shearing force can be efficiently applied to pulp fiber to promote preliminary fibrillization. Use of a refiner in the fibrillization treatment step is preferable from the viewpoint of eliminating the necessity of separation and washing after treatment.

Cellulose microfiber (MFC) is fiber formed of cellulose or a derivative of cellulose. Ordinary cellulose microfiber has a high hydration property, and hydrates in an aqueous medium to stably maintain a dispersed state (dispersion liquid state). Monofilaments forming cellulose microfiber may form fiber with a plurality of filaments aggregated in an aqueous medium.

The micronization (fibrillization) treatment is performed to the extent that the number average fiber diameter (fiber width; average diameter of monofilaments) of cellulose microfiber is preferably 0.1 μm or more, more preferably in the range of 0.1 to 15 μm, especially preferably in the range of 0.2 to 10 μm. When the treatment is performed to the extent that the number average fiber diameter (width) is 0.1 μm or more, it is possible to dewater the fiber by mixing resin powder, and the strength of the fibrous cellulose composite resin is improved.

Specifically, if the average fiber diameter is less than 0.1 μm, there is no difference between the cellulose microfiber and the cellulose nanofiber, so that a sufficient reinforcing effect (particularly bending elastic modulus) cannot be obtained. In addition, the time of micronization treatment increases, so that a large amount of energy is required, leading to an increase in production cost. Moreover, even if the resin powder is added as in this embodiment, dewatering becomes difficult, so that a large amount of energy is required for drying. On the other hand, if the average fiber diameter is more than 15 μm, the fiber tends to be poor in dispersibility. If the dispersibility of the fiber is insufficient, the fiber is poor in reinforcing effect.

The average fiber length (length of monofilament) of the cellulose microfiber is preferably 0.02 to 3.0 mm, more preferably 0.05 to 2.0 mm, especially preferably 0.1 to 1.5 mm. If the average fiber length is less than 0.02 mm, it may be impossible to form a three-dimensional network of fibers, leading to a significant decrease in reinforcing effect. The average fiber length can be arbitrarily adjusted by, for example, selection of raw material fiber, pretreatment, and fibrillation treatment.

In this embodiment, the ratio of cellulose microfiber having a fiber length of 0.2 mm or less is preferably 12% or more, more preferably 16% or more, especially preferably 26% or more. If the ratio is less than 12%, it may be impossible to obtain a sufficient reinforcing effect. On the other hand, there is no upper limit on the ratio of cellulose microfiber having a fiber length of 0.2 mm or less, all the cellulose microfiber may be 0.2 mm or less.

The aspect ratio of cellulose microfiber is preferably 2 to 30,000, more preferably 10 to 10,000 for improving the mechanical strength while maintaining some degree of ductility of the resin.

The aspect ratio is a value obtained by dividing an average fiber length by an average fiber width. It is considered that when the aspect ratio increases, the number of caught portions in the resin becomes larger, so that the reinforcing effect is enhanced, and on the other hand, the ductility of the resin decreases as the number of the caught portions becomes larger.

In this embodiment, the fibrillation ratio of the cellulose microfiber is preferably 1.0% or more, more preferably 1.5% or more, especially preferably 2.0% or more. The fibrillation ratio is preferably 30.0% or less, more preferably 20.0% or less, especially preferably 15.0% or less. If the fibrillation ratio is more than 30.0%, it may be impossible to obtain an intended effect because micronization excessively progresses, so that the cellulose microfiber turns into cellulose nanofiber. On the other hand, if the fibrillation ratio is less than 1.0%, there are few hydrogen bonds between the fibrils, resulting in a shortage of firm three-dimensional networks. In this regard, the present inventors have found in the process of various tests that when the fibrillation ratio of cellulose microfiber is 1.0% or more, the fibrils of cellulose microfiber are hydrogen-bonded to construct firmer three-dimensional networks. The present inventors have also found that the area of interfaces contacting the resin increases when the fibrillation ratio is increased, and the reinforcing effect is further improved when a polybasic acid is used as a compatibilizer or for hydrophobic modification. The method for measuring the fibrillation ratio is as described later.

The crystallinity of the cellulose microfiber is preferably 50% or more, more preferably 55% or more, especially preferably 60% or more. When the degree of crystallinity is less than 50%, compatibility with the resin is improved, but the strength of fiber itself tends to decrease, resulting in a poor fibrous cellulose composite resin reinforcing effect.

On the other hand, the degree of crystallinity of the cellulose microfiber is preferably 90% or less, more preferably 88% or less, especially preferably 86% or less. When the degree of crystallinity is more than 90%, the ratio of strong hydrogen bonds in the molecule increases, so that the fiber itself becomes rigid, but compatibility with the resin tends to decrease, resulting in a poor resin composition reinforcing effect. In addition, it tends to be difficult to chemically modify cellulose microfiber. The degree of crystallinity can be arbitrarily adjusted by, for example, selection of raw material fiber, pretreatment, and micronization treatment.

The pulp viscosity of the cellulose microfiber is preferably 2 cps or more, more preferably 4 cps or more. If the pulp viscosity is less than 2 cps, it tends to be impossible to sufficiently suppress aggregation of the cellulose microfiber even by addition of resin powder to cellulose microfiber, resulting in a poor fibrous cellulose composite resin reinforcing effect.

The freeness of cellulose microfiber is preferably 500 cc or less, more preferably 300 cc or less, especially preferably 100 cc or less. If the freeness is more than 500 cc, the fiber width of the cellulose microfiber exceeds 15 µm, so that the reinforcing effect is not sufficient.

(Dispersion Liquid)

The cellulose microfiber obtained by performing micronization treatment is dispersed in an aqueous medium to obtain a dispersion liquid. It is especially preferable that the whole of the aqueous medium is water, and an aqueous medium, a part of which is another liquid having compatibility with water, can be preferably used. As the other liquid, a lower alcohol having 3 or less carbon atoms, or the like can be used.

It is preferable that the dispersion liquid is concentrated to adjust the solid content concentration. The solid content concentration of the dispersion liquid is preferably 1.0% by mass or more, more preferably 1.5% by mass or more, especially preferably 2.0% by mass or more. The solid content concentration of the dispersion liquid is preferably 70% by mass or less, more preferably 60% by mass or less, especially preferably 50% by mass or less. A solid content concentration of less than 1.0% by mass may be smaller than the concentration of the cellulose microfiber dispersion liquid obtained by performing micronization treatment. On the other hand, if the solid content concentration is more than 70% by mass, the dispersion liquid may be difficult to subsequently dilute and disperse, and thus difficult to mix with a polybasic acid, resin powder, and other compositions.

It is preferable that some or all of hydroxyl groups in the cellulose microfiber of this embodiment are modified with a polybasic acid, and this point will be described later.

(Addition of Resin Powder)

Next, the cellulose microfiber dispersion liquid is mixed with resin powder having an average particle size of 1 to 1,500 µm. When the resin powder is mixed, hydrogen bonds between cellulose microfibers subsequently dewatered and dried are hindered, so that dispersibility is improved. In addition, in combination with the average fiber diameter of 0.1 µm or more in the cellulose microfiber, mixing with the resin powder enables dewatering, so that the amount of energy for drying can be significantly reduced. Therefore, the addition of the resin powder can be performed during concentration of the dispersion liquid described above.

The resin to be added may be, for example, a pellet-shaped resin, a sheet-shaped resin, or the like, and in this embodiment, a powdered resin (resin powder) is used. The types of usable resins are the same as those for resin pellets described later, and therefore are not described here.

The average particle size of the resin powder is preferably 1 to 1,500 µm, more preferably 10 to 1,200 µm, especially preferably 100 to 1,000 µm. If the average particle size is more than 1,500 µm, there is the possibility that the dispersibility and dewaterability of the cellulose microfiber are not improved. On the other hand, if the average particle size is less than 1 µm, the fiber may be so fine that hydrogen bonds between cellulose microfibers cannot be hindered, and thus there is the possibility that dispersibility is not improved. If the average particle size is less than 1 µm, there is the possibility that dewaterability is not improved.

When more emphasis is placed on the dewaterability of the cellulose microfiber, the content (addition amount) of the resin powder is preferably 10 to 100,000 parts by mass, more preferably 50 to 10,000 parts by mass, especially preferably 100 to 1,000 parts by mass, based on 100 parts by mass of cellulose microfiber. If the content of the resin powder is less than 10 parts by mass, there is the possibility that dewaterability is not sufficiently improved. On the other hand, if the content of the resin powder is more than 100,000 parts by mass, it may be impossible to obtain an effect from incorporation of cellulose microfiber.

(Dewatering and Drying)

The fibrous cellulose-containing material containing cellulose microfiber and resin powder is dried, preferably dewatered and dried, to obtain dried fibrous cellulose. The fibrous cellulose-containing material of this embodiment contains cellulose microfiber rather than cellulose nanofiber, and therefore can be dewatered. The fibrous cellulose-containing material of this embodiment further contains resin powder, and therefore can be easily dewatered. When the fibrous cellulose-containing material is dewatered before being dried, the amount of energy required for drying is extremely small. In addition, since the fibrous cellulose-containing material contains resin powder, the fibrous cellulose-containing material is unlikely to be no longer dispersed even when formed into dried fibrous cellulose.

The cellulose microfiber of this embodiment is modified or is not modified with a polybasic acid or the like. When modified with polybasic acid, the moisture content ratio (water content ratio) of the dried fibrous cellulose (dewatered and dried fibrous cellulose-containing material) is preferably 5% by mass or less, more preferably 3% by mass or less, still more preferably 1% by mass or less, especially preferably 0% by mass. If the moisture content ratio is more than 5%, there is the possibility that the cellulose microfiber is not modified with a polybasic acid. If the moisture content ratio is high, economic efficiency is compromised because for example, when the dried fibrous cellulose is subsequently kneaded, the kneading involves an enormous amount of energy.

On the other hand, when the cellulose microfiber is not modified with a polybasic acid, the moisture content ratio of the dewatered and dried cellulose microfiber is preferably more than 5% by mass, more preferably 8% by mass or more, especially preferably 10% by mass or more. If the water content ratio is more than 5% by mass, the resulting fibrous cellulose composite resin contains a polybasic acid because modification of cellulose fiber with a polybasic acid no longer proceeds when the dried fibrous cellulose is subsequently kneaded.

For the dewatering treatment, one or more selected from, for example, a belt press, a screw press, a filter press, a twin roll, a twin wire former, a valveless filter, a center disk filter, a film treatment, and a centrifuge can be used.

For the drying treatment, one or more selected from, for example, rotary kiln drying, disc drying, airflow drying, medium flow drying, spray drying, drum drying, screw conveyor drying, paddle drying, uniaxial kneading drying, multiaxial kneading drying, vacuum drying, and stirring drying can be performed.

After the dewatering and drying treatment, for example, grinding treatment may be performed. For the grinding treatment, one or more selected from, for example, a bead mill, a kneader, a disperser, a twist mill, a cut mill, and a hammer mill can be used.

The shape of the dewatered and dried fibrous cellulose can be powder, pellet, sheet, or the like.

In the case of powder, the average particle size of the dried fibrous cellulose is preferably 1 to 10,000 µm, more preferably 10 to 5,000 µm, especially preferably 100 to 1,000 µm. If the average particle size is more than 10,000 µm, there is the possibility that the dried fibrous cellulose cannot be accommodated in a kneading apparatus because of the large particle size. On the other hand, economic efficiency is compromised because the pulverization treatment requires energy for setting the average particle size to less than 1 µm.

When the dried fibrous cellulose is powdered, the bulk specific gravity is preferably 0.01 to 1.5, more preferably 0.04 to 1, especially preferably 0.1 to 0.5. A bulk specific gravity of more than 1.5 is difficult to achieve physically because this means that the gravity of cellulose is more than 1.5. On the other hand, a bulk specific gravity of less than 0.01 is disadvantageous in terms of transfer cost.

(Kneading)

If necessary, resin pellets are added to and kneaded with the dried fibrous cellulose to obtain a fibrous cellulose composite resin. When the resin pellets are not added, kneading is performed simply by applying heat to form the dried fibrous cellulose into a fibrous cellulose composite resin. As described above, the description of the types and the like of resin pellets in this embodiment is also relevant to the foregoing resin powder.

It is preferable that during or before kneading, a polybasic acid is further added, so that cellulose fiber is modified with the polybasic acid, or the kneaded product contains the polybasic acid. As described above, the moisture content ratio (water content ratio) of the cellulose microfiber during kneading is important.

As the resin, either a thermoplastic resin or a thermosetting resin can be used.

As the thermoplastic resin, one or more selected from, for example, polyolefins such as polypropylene (PP) and polyethylene (PE), polyester resins such as aliphatic polyester resins and aromatic polyester resins, polystyrene, polyacrylate resins such as methacrylate, and acrylate, polyamide resins, polycarbonate resins, and polyacetal resins can be used.

It is preferable to use at least one of a polyolefin and a polyester resin. It is preferable to use polypropylene as the polyolefin. As the polypropylene, one or more selected from homopolymers, random polymers, and block polymers can be used. Further, examples of the polyester resin include aliphatic polyester resins such as polylactic acid and polycaprolactone, and the aromatic polyester resin such as polyethylene terephthalate. It is preferable to use a biodegradable polyester resin (also referred to simply as "biodegradable resin").

As the biodegradable resin, one or more selected from, for example, hydroxycarboxylic acid-based aliphatic polyester, caprolactone-based aliphatic polyester, and dibasic acid polyester can be used.

As the hydroxycarboxylic acid-based aliphatic polyester, one or more selected from, for example, homopolymers of hydroxycarboxylic acids such as lactic acid, malic acid, glucose acid, and 3-hydroxybutyric acid, and copolymers obtained using at least one of these hydroxycarboxylic acids can be used. It is preferable to use polylactic acid, a copolymer of lactic acid and any of the hydroxycarboxylic acids except for lactic acid, polycaprolactone, or a copolymer of at least one of the hydroxycarboxylic acids and caprolactone. It is especially preferable to use polylactic acid.

As this lactic acid, for example, L-lactic acid, D-lactic acid, or the like can be used, and one of these lactic acids may be used alone, or two or more thereof may be selected and used.

As the caprolactone-based aliphatic polyester, one or more selected from, for example, homopolymers of polycaprolactone and copolymers of polycaprolactone and the hydroxycarboxylic acid can be used.

As the dibasic acid polyester, one or more selected from, for example, polybutylene succinate, polyethylene succinate, and polybutylene adipate can be used.

One of the biodegradable resins may be used alone, or two or more thereof may be used in combination.

As the thermosetting resin, for example, phenol resin, urea resin, melamine resin, furan resin, unsaturated polyester, diallyl phthalate resin, vinyl ester resin, epoxy resin, polyurethane-based resin, silicone resin, and thermosetting polyimide-based resin can be used. One of these resins may be used alone, or two or more thereof may be used in combination.

The resin pellet may contain an inorganic filler preferably at a ratio which ensures that interference with thermal recycling does not occur.

Examples of the inorganic filler include single elements, oxides, hydroxides, carbonates, sulfates, silicates, and sulfites of metallic elements of Groups I to VIII of the periodic table, such as Fe, Na, K, Cu, Mg, Ca, Zn, Ba, Al, Ti, and silicon element, and various clay minerals including the foregoing compounds.

Specific examples thereof include barium sulfate, calcium sulfate, magnesium sulfate, sodium sulfate, calcium sulfite, zinc oxide, silica, heavy calcium carbonate, light calcium carbonate, aluminum borate, alumina, iron oxide, calcium titanate, aluminum hydroxide, magnesium hydroxide, calcium hydroxide, sodium hydroxide, magnesium carbonate, calcium silicate, clay wollastonite, glass beads, glass powder, silica sand, silica stone, quartz powder, diatomaceous earth, white carbon, and glass fiber. The resin pellet may contain two or more of these inorganic fillers. These inorganic fillers may be contained in recycled pulp.

As described above, use of resin pellets is not required for obtaining a fibrous cellulose composite resin, and when the resin pellets are used, the content of the resin pellets is preferably 1 to 1,000,000 parts by mass, more preferably 10 to 100,000 parts by mass, based on 100 parts by mass of resin powder. In relative terms, if the amount of resin powder increases (the amount of resin pellets decreases), the bulk specific gravity tends to increase, and therefore the discharge rate in the kneader tends to decrease. On the other hand, if the amount of resin powder decrease (the number of resin pellets increased), the dispersibility and the dewaterability of cellulose microfiber in the resin tend to decrease.

The combination ratio of the cellulose microfiber and the entire resin (resin powder or resin powder and resin pellets) is preferably 10 to 100,000 parts by mass, more preferably 100 to 10,000 parts by mass, based on 100 parts by mass of fibrous cellulose. When the combination ratio is within the above-described range, the strength of the fibrous cellulose composite resin, particularly the bending strength and the tensile elastic modulus can be markedly improved, and the production cost can be reduced because of excellent dewaterability. The content ratio of the cellulose microfiber and the resin contained in the finally obtained fibrous cellulose composite resin is normally equal to the combination ratio of the cellulose microfiber and the resin which are used in production.

(Polybasic Acid)

The polybasic acid will now be described.

When the cellulose microfiber is modified, examples of the method for the modification include hydrophobic modification such as esterification, etherification, amidation, and sulfidation. It is preferable that esterification is employed as a method for hydrophobically modifying the cellulose microfiber.

Examples of the esterification method include esterification with a hydrophobizing agent such as carboxylic acid, a carboxylic acid halide, acetic acid, propionic acid, acrylic acid, methacrylic acid, phosphoric acid, sulfonic acid, polybasic anhydride, and derivatives thereof. It is preferable to use a polybasic acid such as polybasic anhydride or a derivative thereof as the hydrophobizing agent.

One preferable form of modifying the cellulose fiber with polybasic acid is a method in which some or all of the hydroxyl groups of the cellulose fiber are substituted with a functional group of the following structural formula (1) or structural formula (2).

[Chemical Formula 1]

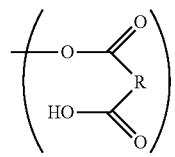

Structural Formula (1)

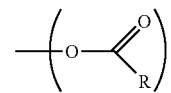

Structural Formula (2)

R in the structural formula is a linear, branched, or annular saturated hydrocarbon group or a derivative thereof; a linear, branched, or annular unsaturated hydrocarbon group or a derivative thereof; or an aromatic group or a derivative thereof.

As the polybasic acid that is used for such modification, one or more selected from, for example, oxalic acid compounds, phthalic acid compounds, malonic acid compounds, succinic acid compounds, glutaric acid compounds, adipic acid compounds, tartaric acid compounds, glutamic acid compounds, sebacic acid compounds, hexafluorosilicic acid compounds, maleic acid compounds, itaconic acid compounds, citraconic acid compounds, and citric acid compounds can be used. The polybasic acid is preferably at least one of phthalic acid, phthalates, and derivatives thereof (of phthalic acid compounds).

Examples of phthalic acid compounds (derivatives) include phthalic acid, potassium hydrogen phthalate, sodium hydrogen phthalate, sodium phthalate, ammonium phthalate, dimethyl phthalate, diethyl phthalate, diallyl phthalate, diisobutyl phthalate, dinormalhexyl phthalate, dioctyl phthalate, diisononyl phthalate, diisodecyl phthalate, and ditriisodecyl phthalate. Preferably, phthalic acid is used.

As the polybasic anhydrides, one or more selected from, for example, maleic anhydride compounds, phthalic anhydride compounds, itaconic anhydride compounds, citraconic anhydride compounds, and citrate anhydride compounds can be used. It is preferable to use maleic anhydride compounds, and it is more preferable to use phthalic anhydride compounds.

Examples of the phthalic anhydride compound include phthalic anhydride, tetrahydrophthalic anhydride, methyltetrahydrophthalic anhydride, methylhexahydrophthalic anhydride, hydroxyphthalic anhydride, hexahydrophthalic anhydride, 4-ethynylphthalic anhydride, and 4-phenylethynylphthalic anhydride. It is preferable to use phthalic anhydride.

When a polybasic anhydride is used, and cellulose fiber is modified, some of hydroxyl groups are substituted with a predetermined functional group, so that the compatibility of the cellulose microfiber and the resin is improved.

On the other hand, when the polybasic acid is merely contained without modifying the cellulose fiber with the polybasic acid, the polybasic acid functions as a compatibilizer, so that compatibility is improved. As a result, the strength, particularly the bending strength, of the resulting fibrous cellulose composite resin is improved.

When the polybasic acid functions as a compatibilizer, the degree of progress of modification of the cellulose fiber does not matter, and therefore the quality of the resulting fibrous cellulose composite resin is stabilized. However, it is necessary to pay attention to the water content ratio of the cellulose microfiber during kneading (this point is as described above) so that the cellulose fiber is not modified.

It is preferable that as the polybasic anhydride, one represented by the following structural formula (3) or structural formula (4) is used regardless of whether the cellulose fiber is modified or simply contained.

[Chemical Formula 2]

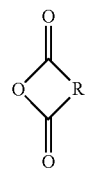

Structural Formula (3)

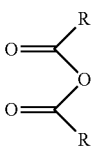

Structural Formula (4)

R in the structural formula is a linear, branched, or annular saturated hydrocarbon group or a derivative thereof; a linear, branched, or annular unsaturated hydrocarbon group or a derivative thereof; or an aromatic group or a derivative thereof.

The compatibility of the cellulose microfiber and the resin is improved by using a polybasic anhydride represented by structural formula (3) or structural formula (4).

The blending mass ratio of the polybasic acid in terms of a solid content is preferably 0.1 to 50% by mass, more preferably 1 to 30% by mass, especially preferably 2 to 20% by mass, regardless of whether the polybasic acid is used for modification or simply contained.

For the kneading treatment, one or more selected from, for example, a single-screw or multi-screw kneader with two or more screws, a mixing roll, a kneader, a roll mill, a Banbury mixer, a screw press, and a disperser can be used.

In particular, use of a multi-screw kneader with two or more screws is preferable. One or more multi-screw kneaders with two or more screws may be used with the kneaders arranged side by side or in series.

The peripheral speed of the screw of the multi-screw kneader with two or more screws is preferably 0.2 to 200 m/min, more preferably 0.5 to 150 m/min, especially preferably 1 to 100 m/min. If the peripheral speed is less than 0.2 m/min, the cellulose microfiber cannot be well dispersed in the resin. On the other hand, when the peripheral speed is more than 200 m/min, the shearing force on the cellulose microfiber becomes excessively strong, so that a reinforcing effect cannot be obtained.

The ratio of the screw diameter to the length of the kneading section of the kneader used in this embodiment is preferably 15 to 60. If the ratio is less than 15, there is the possibility that the cellulose microfiber cannot be mixed with the resin because the kneading section is short. If the ratio is more than 60, there is the possibility that the kneading section is so long that the shearing load and the heat load on the cellulose microfiber increase, and thus a reinforcing effect cannot be obtained.

The temperature of the kneading treatment is equal to or higher than the glass transition point of the resin, varies depending on the type of resin, and is preferably 80 to 280° C., more preferably 90 to 260° C., especially preferably 100 to 240° C.

Polypropylene maleic anhydride may be added at the time of kneading. The addition amount of polypropylene maleic anhydride is preferably 1 to 1,000 parts by mass, more preferably 5 to 500 parts by mass, especially preferably 10 to 200 parts by mass based on 100 parts by mass of combination amount of the cellulose microfiber. If the addition amount is less than 1 part by mass, the effect is insufficient. On the other hand, an addition amount of more than 1,000 parts by mass may be an excessively large addition amount which rather causes a decrease in strength of the resin matrix.

At the time of kneading, an amine compound may be added as a method for adjusting the pH of the cellulose microfiber slurry. Examples of the amine compound include methylamine, dimethylamine, trimethylamine, ethylamine, diethylamine, triethylamine, ethylenediamine, triethanolamine, N,N-dimethylpropan-2-amine, tetramethylethyleneamine, hexamethylamine, spermidine, spermine, amantadine, aniline, phenethylamine, toluidine, catecholamine, 1,8-bis(dimethylamino)naphthalene, pyrrolidine, piperidine, piperazine, morpholine, quinuclidine, pyrrole, pyrazole, imidazole, pyridine, pyridazine, pyrimidine, pyrazine, oxazole, thiazole, and 4-dimethylamino pyridine.

The addition amount of the amine compound is preferably 1 to 1,000 parts by mass, more preferably 5 to 500 parts by mass, especially preferably 10 to 200 parts by mass based on 100 parts by mass of combination amount of the cellulose microfiber. If the addition amount is less than 1 part by mass, the pH adjustment is insufficient. On the other hand, an addition amount of more than 200 parts by mass may be an excessively large addition amount which rather causes a decrease in strength of the resin matrix.

When the cellulose microfiber is hydrophobically modified, a solvent may not be required to be used. When a solvent is used, examples thereof include protic polar solvents, aprotic polar solvents, non-polar solvents, and resins. However, it is preferable to use a resin as the solvent, and in this embodiment, the cellulose microfiber is modified when kneaded with the resin, and therefore substantially no solvent may be needed.

As the protic polar solvent, for example, formic acid, butanol, isobutanol, nitromethane, ethanol, methanol, acetic acid, or water can be used.

As the aprotic polar solvent, for example, N-methylpyrrolidone, tetrahydrofuran, ethyl acetate, acetone, dimethylformamide, acetonitrile, dimethylsulfoxide, propylene carbonate, or the like can be used.

As the non-polar solvent, for example, hexane, benzene, toluene, chloroform, diethyl ether, dichloromethane, or the like can be used.

A difference in solubility parameter $(cal/cm^3)^{1/2}$ (SP value) between the cellulose microfiber and the resin can be determined from the expression: difference in SP value=$SP_{MFC}$ value–$SP_{POL}$ value, where $SP_{MFC}$ value is a solubility parameter of the cellulose microfiber and $SP_{POL}$ value is a solubility parameter of the resin. The difference in SP value is preferably 0.1 to 10, more preferably 0.5 to 8, especially preferably 1 to 5. If the difference in SP value is more than 10, the cellulose microfiber is not dispersed in the resin, and thus a reinforcing effect cannot be obtained. On the other hand, if the difference in SP value is less than 0.1, the cellulose microfiber is dissolved in the resin, and does not function as a filler, and thus a reinforcing effect cannot be obtained. In this respect, the reinforcing effect increases as the difference between the $SP_{POL}$ value of the resin (solvent) and the $SP_{MFC}$ value of the cellulose microfiber (solute) decreases. The solubility parameter $(cal/cm^3)^{1/2}$ (SP value) is a measure of the intermolecular force acting between the solvent and the solute, and the solubility increases as the difference in SP value between the solvent and the solute decreases.

(Other Raw Materials)

One or more of various fine fibers called cellulose nanofibers, microfibril cellulose, microfibrillar microfiber, cellulose microfiber, microfibrillated cellulose, super-microfibril cellulose, and the like can be incorporated in the cellulose microfiber, or the cellulose microfiber may contain these fine fibers. In addition, fibers obtained by further micronizing these fine fibers can be incorporated in the cellulose microfiber, or the cellulose microfiber may contain such fibers. However, the ratio of the cellulose microfiber to all the raw material fiber needs to be 10% by mass or more, preferably 30% by mass or more, more preferably 60% by mass or more.

In addition to the above fibers, fibers derived from kenaf, jute hemp, manila hemp, sisal hemp, geese bark, paper birch, Broussonetia papyrifera, bananas, pineapples, coconut, corn, sugar canes, bagasse, palm, papyrus, reeds, esparto, survival grass, wheat, rice, bamboo, various needle-leaved trees (e.g. cedar and cypress), broad-leaved trees, and cotton can be incorporated in the cellulose microfiber, and the cellulose microfiber may contain such fibers.

As raw materials for the fibrous cellulose composite resin, for example, one or more selected from, for example, antistatic agents, flame retardants, antibacterial agents, colorants, radical scavengers, and foaming agents can be used in addition to the cellulose microfiber and the resin as long as the effects of the present invention are not hindered.

These raw materials may be mixed with a dispersion liquid of cellulose microfiber, kneaded at the time of kneading the dried fibrous cellulose and resin pellets, kneaded with a kneaded product thereof, or kneaded by other methods. However, from the viewpoint of production efficiency, it is preferable to knead the above-mentioned raw materials at the time of kneading the dried fibrous cellulose and the resin pellets.

The resin may contain an ethylene-α-olefin copolymer elastomer or a styrene-butadiene block copolymer. Examples of the α-olefin include butene, isobutene, pentene, hexene, methyl-pentene, octene, decene, and dodecene.
(Molding Treatment)

The kneaded product of the dried fibrous cellulose and the resin pellets may be kneaded again if necessary, and then molded into a desired shape to obtain a fibrous cellulose composite resin. Even if the modified cellulose microfiber is dispersed in the kneaded product, excellent molding processability is exhibited.

The size, the thickness, the shape, and the like of the molded product are not particularly limited, and the molded product may have, for example, a sheet shape, a pellet shape, a powder shape, a fiber shape, or the like.

The temperature during the molding treatment is equal to or higher than the glass transition point of the resin, varies depending on the type of resin, and is preferably 80 to 280° C., more preferably 90 to 260° C., especially preferably 100 to 240° C.

As an apparatus for molding treatment, one or more selected from, for example, an injection molding machine, a blowing molding machine, a hollow molding machine, a blow molding machine, a compression molding machine, an extrusion molding machine, a vacuum molding machine, and a pressure molding machine can be used.

The molding treatment can be performed by a known molding method, for example, metallic molding, injection molding, extrusion molding, hollow molding, expansion molding, or the like. Alternatively, the kneaded product may be spun into a fibrous form, and mixed with the above-mentioned plant material or the like to be formed into a mat shape or a board shape. Fiber mixing can be performed by, for example, a method in which fibers are simultaneously deposited with an air ray.

The molding treatment can be performed subsequently to kneading treatment, or by cooling the kneaded product on a temporary basis, forming the kneaded product into chips using a crushing machine or the like, and then introducing the resulting chips into a molding machine such as an extrusion molding machine or an injection molding machine.
(Definition of Terms, Measurement Method, Etc.)

The terms as used herein are as follows unless otherwise specified.
(Average Fiber Diameter)

100 ml of an aqueous dispersion liquid of cellulose microfiber having a solid concentration of 0.01 to 0.1% by mass is filtered through a Teflon (registered trademark) membrane filter, and solvent substitution is performed once with 100 ml of ethanol and 3 times with 20 ml of t-butanol. Next, the fine cellulose fiber is freeze-dried, and coated with osmium to obtain a sample. This sample is observed with an electron microscope SEM image at a magnification of 5,000 times, 10,000 times, or 30,000 times depending on the width of the constituent fiber. Specifically, two diagonals are drawn in the observation image, and three straight lines passing through the intersection of the diagonals are arbitrarily drawn. Further, the widths of a total of 100 filaments intersecting the three straight lines are visually measured. The median diameter of the measured values is defined as an average fiber diameter.
(Average Fiber Length/Fibrillation Ratio)

The average fiber length and fibrillation ratio are measured by a fiber analyzer "FS5" from Valmet K.K.

(Aspect Ratio)

The aspect ratio is a value obtained by dividing an average fiber length by an average fiber width (diameter).
(Degree of Crystallinity)

The degree of crystallinity is a value measured by an X-ray diffraction method in accordance with JIS-K0131 (1996), "General Rule of X-Ray Diffraction Analysis". In addition, cellulose microfiber has an amorphous part and a crystalline part, and the degree of crystallinity means a ratio of the crystalline part to the entire cellulose microfiber.
(Pulp Viscosity)

The pulp viscosity is measured in accordance with JIS-P8215 (1998). The higher the pulp viscosity, the higher the degree of polymerization of the cellulose microfiber.
(Freeness)

The freeness is a value measured in accordance with JIS P8121-2:2012.
(Water Content Ratio (Moisture Content Ratio))

The moisture content ratio of the fiber is a value calculated from the following formula, where the mass after drying is a mass at the time when the mass no longer changes when a sample is held at 105° C. for 6 hours using a constant temperature dryer.

fiber moisture content ratio (%)=[(mass before drying−mass after drying)÷mass before drying]×100

EXAMPLES

Examples of the present invention will now be described to demonstrate the effects of the present invention.

Example 1

83 g of polypropylene resin powder was added to 365 g of an aqueous dispersion liquid of cellulose microfiber having a solid content concentration of 2.75 wt %, and the mixture was dewatered by suction filtration with filter paper No. 2 for 30 minutes to obtain a fibrous cellulose-containing material.

Dewatered (aggregated) fibrous cellulose obtained by the dewatering was dried by heating at 105° C. to obtain dried fine cellulose. The water content ratio of the dried fibrous cellulose was less than 10%. The dried fibrous cellulose and 7 g of phthalic acid were kneaded with a twin-screw kneader at 180° C. and 200 rpm to obtain a fibrous cellulose composite resin. The obtained fibrous cellulose composite resin was cut into a cylinder having a diameter of 2 mm and a length of 2 mm with a pelleter, and injection-molded into a rectangular parallelepiped test piece (length: 59 mm, width: 9.6 mm, and thickness: 3.8 mm) at 180° C.

Table 1 shows the physical properties of the cellulose microfiber, the particle size of the resin powder, the amount of filtration during dewatering, and the combination ratio of the cellulose microfiber (MFC), the chemical (phthalic acid), and the resin powder.

A bending test was conducted on the obtained molded product of the fibrous cellulose composite resin. Table 1 shows the results. The method for evaluation in the bending test is as follows.
(Bending Test)

The bending elastic modulus was measured according to JIS K7171: 2008. The table shows the evaluation results based on the following criteria.

o: The ratio of the bending elastic modulus of the composite resin to the bending elastic modulus of the resin itself is 1.5 or more.

x: The ratio of the bending elastic modulus of the composite resin to the bending elastic modulus of the resin itself is less than 1.5.

TABLE 1

| | Cellulose microfiber (MFC) | | | | Dewatering step | Cellulose microfiber composite resin | | Evaluation in bending test |
|---|---|---|---|---|---|---|---|---|
| | Average fiber width | Average fiber length | Fibrillation ratio | Resin powder | Amount of filtration | MFC:chemical:resin | Chemical | — |
| Example 1 | 0.1 μm or more | 1.08 mm | 4.06 | 125 μm | 257 ml | 10:7:83 | Phthalic acid | ○ |
| Example 2 | 0.1 μm or more | 1.08 mm | 4.06 | 1,500 μm | 252 ml | 10:7:83 | Phthalic acid | ○ |
| Example 3 | 0.1 μm or more | 0.20 mm | 8.37 | 125 μm | 223 ml | 10:7:83 | Phthalic acid | ○ |
| Example 4 | 0.1 μm or more | 0.20 mm | 8.37 | 400 μm | 222 ml | 10:7:83 | Phthalic acid | ○ |
| Example 5 | 0.1 μm or more | 0.20 mm | 8.37 | 700 μm | 222 ml | 10:7:83 | Phthalic acid | ○ |
| Example 6 | 0.1 μm or more | 0.20 mm | 8.37 | 1,500 μm | 221 ml | 10:7:83 | Phthalic acid | ○ |
| Comparative Example 1 | 0.1 μm or more | 2.10 mm | 0.50 | 125 μm | 297 ml | 10:7:83 | Phthalic acid | x |
| Comparative Example 2 | 0.1 μm or more | 2.10 mm | 0.50 | 1,500 μm | 294 ml | 10:7:83 | Phthalic acid | x |
| Comparative Example 3 | 0.1 μm or more | 2.10 mm | 0.50 | None | 285 ml | 10:7:83 | Phthalic acid | x |
| Comparative Example 4 | 0.1 μm or more | 1.08 mm | 4.06 | None | 238 ml | 10:7:83 | Phthalic acid | x |
| Comparative Example 5 | 0.1 μm or more | 0.20 mm | 8.37 | None | 201 ml | 10:7:83 | Phthalic acid | x |
| Comparative Example 6 | Less than 0.1 μm | — | — | 125 μm | 1 ml | 10:7:83 | Phthalic acid | x |
| Comparative Example 7 | Less than 0.1 μm | — | — | 1,500 μm | 1 ml | 10:7:83 | Phthalic acid | x |
| Comparative Example 8 | Less than 0.1 μm | — | — | None | 1 ml | 10:7:83 | Phthalic acid | x |

Examples 2 to 6 and Comparative Examples 1 to 8

The same test as in Example 1 was conducted while the conditions were changed as shown in Table 1. Table 1 shows the results. Basically, the polybasic acid was added immediately before kneading.

Example 7

10 g of polypropylene resin powder was added to 365 g of an aqueous dispersion liquid of cellulose microfiber having a solid content concentration of 2.75 wt %, and the mixture was dewatered by suction filtration with filter paper No. 2 for 30 minutes to obtain a fibrous cellulose-containing material.

Dewatered (aggregated) fibrous cellulose obtained by the dewatering was dried by heating at 105° C. to obtain dried fine cellulose. The water content ratio of the dried fibrous cellulose was less than 10%. The dried fibrous cellulose, 7 g of phthalic acid and 73 g of polypropylene pellets were kneaded with a twin-screw kneader at 180° C. and 200 rpm to obtain a fibrous cellulose composite resin. The obtained fibrous cellulose composite resin was cut into a cylinder having a diameter of 2 mm and a length of 2 mm with a pelleter, and injection-molded into a rectangular parallelepiped test piece (length: 59 mm, width: 9.6 mm, and thickness: 3.8 mm) at 180° C.

Table 2 shows the physical properties of the cellulose microfiber, the particle size of the resin powder, the amount of filtration during dewatering, and the combination ratio of the cellulose microfiber (MFC), the chemical (phthalic acid), and the resin powder.

A bending test was conducted on the obtained molded product of the fibrous cellulose composite resin. Table 2 shows the results. The method for evaluation in the bending test is as described above.

TABLE 2

| | Dried cellulose microfiber | | | | | Dewatering step | Cellulose microfiber composite resin | | Evaluation in bending test |
|---|---|---|---|---|---|---|---|---|---|
| | Average fiber width | Average fiber length | Fibrillation ratio | Resin powder | MFC: resin powder | Amount of filtration | MFC:chemical: resin powder: resin pellets | Chemical | — |
| Example 7 | 0.1 μm or more | 1.08 mm | 4.06 | 125 μm | 10:10 | 251 ml | 10:7:10:73 | Phthalic acid | ○ |
| Example 8 | 0.1 μm or more | 0.20 mm | 8.37 | 125 μm | 10:10 | 221 ml | 10:7:10:73 | Phthalic acid | ○ |
| Example 9 | 0.1 μm or more | 0.20 mm | 8.37 | 1,500 μm | 10:10 | 217 ml | 10:7:10:73 | Phthalic acid | ○ |
| Comparative Example 9 | 0.1 μm or more | 1.08 mm | 4.06 | 125 μm | 10:1 | 240 ml | 10:7:1:82 | Phthalic acid | x |
| Comparative Example 10 | 0.1 μm or more | 0.20 mm | 8.37 | 125 μm | 10:1 | 209 ml | 10:7:1:82 | Phthalic acid | x |
| Comparative Example 11 | 0.1 μm or more | 2.10 mm | 0.50 | 125 μm | 10:10 | 289 ml | 10:7:10:73 | Phthalic acid | x |

Examples 8 and 9 and Comparative Examples 9 to 11

The same test as in Example 7 was conducted while the conditions were changed as shown in Table 2. Table 2 shows the results. Basically, the polybasic acid was added immediately before kneading.

INDUSTRIAL APPLICABILITY

The present invention is applicable as a fibrous cellulose-containing material and a method for producing the same, dried fibrous cellulose and a method for producing the same, and a fibrous cellulose composite resin and a method for producing the same.

The invention claimed is:

1. A fibrous cellulose-containing material comprising cellulose microfiber having an average fiber length of 0.02 to 3.0 mm, a pulp viscosity of more than 4 cps, and a fibrillation ratio of 1.0% to 8.37%; and resin powder having an average particle size of 1 to 1,500 μm.

2. The fibrous cellulose-containing material according to claim 1,
wherein the combination ratio of the resin powder is 10 to 100,000 parts by mass based on 100 parts by mass of the cellulose microfiber.

3. The fibrous cellulose-containing material according to claim 2,
wherein the cellulose microfiber has an average fiber width of 0.1 m or more, and
wherein a ratio of the cellulose microfiber to all raw material fiber is at least 60% by mass.

4. The fibrous cellulose-containing material according to claim 2,
wherein the cellulose microfiber is modified with a polybasic acid, and/or
the fibrous cellulose-containing material contains a polybasic acid.

5. The fibrous cellulose-containing material according to claim 1,
wherein the cellulose microfiber has an average fiber width of 0.1 m or more, and
wherein a ratio of the cellulose microfiber to all raw material fiber is at least 60% by mass.

6. The fibrous cellulose-containing material according to claim 5,
wherein the cellulose microfiber is modified with a polybasic acid, and/or
the fibrous cellulose-containing material contains a polybasic acid.

7. The fibrous cellulose-containing material according to claim 1,
wherein the cellulose microfiber is modified with a polybasic acid, and/or
the fibrous cellulose-containing material contains a polybasic acid.

8. Dried fibrous cellulose formed by drying a fibrous cellulose-containing material comprising
cellulose microfiber having an average fiber length of 0.02 to 3.0 mm, a pulp viscosity of more than 4 cps, and a fibrillation ratio of 1.0% to 8.37%; and a resin powder having an average particle size of 1 to 1,500 μm.

9. A fibrous cellulose composite resin formed by kneading a dried fibrous cellulose-containing material comprising
cellulose microfiber having an average fiber length of 0.02 to 3.0 mm, a pulp viscosity of more than 4 cps, and a fibrillation ratio of 1.0% to 8.37%; and a resin powder having an average particle size of 1 to 1,500 μm.

10. A method for producing a fibrous cellulose-containing material, comprising:
preparing a dispersion liquid of cellulose microfiber by fibrillating raw material pulp to the extent that the average fiber length is 0.02 to 3.0 mm, a pulp viscosity is more than 4 cps, and a fibrillation ratio is 1.0% to 8.37%; and
mixing the dispersion liquid with resin powder having an average particle size of 1 to 1,500 μm.

11. A method for producing dried fibrous cellulose, comprising:
preparing a dispersion liquid of cellulose microfiber by fibrillating raw material pulp to the extent that the average fiber length is 0.02 to 3.0 mm, a pulp viscosity is more than 4 cps, and a fibrillation ratio is 1.0% to 8.37%;
preparing a fibrous cellulose-containing material by mixing the dispersion liquid with resin powder having an average particle size of 1 to 1,500 km; and
concentrating the fibrous cellulose-containing material to a water content ratio of 95% or less, and then performing drying.

12. A method for producing a fibrous cellulose composite resin, comprising:
preparing a dispersion liquid of cellulose microfiber by fibrillating raw material pulp to the extent that the average fiber length is 0.02 to 3.0 mm, a pulp viscosity is more than 4 cps, and a fibrillation ratio is 1.0% to 8.37%;
preparing a fibrous cellulose-containing material by mixing the dispersion liquid with resin powder having an average particle size of 1 to 1,500 μm;
preparing dried fibrous cellulose by drying the fibrous cellulose-containing material; and
kneading the dried fibrous cellulose.

13. The method for producing a fibrous cellulose composite resin according to claim 12,
wherein the dried fibrous cellulose and a resin pellet are kneaded,
the dried fibrous cellulose contains resin powder at a combination ratio of 10,000 parts by mass or less based on 100 parts by mass of the cellulose microfiber, and
the combination ratio of the resin pellet is 10 to 100,000 parts by mass based on 100 parts by mass of the resin powder.

* * * * *